L. H. ANDERSON.
FEED TROUGH.
APPLICATION FILED OCT. 8, 1915.
1,176,016.
Patented Mar. 21, 1916.
2 SHEETS—SHEET 1.
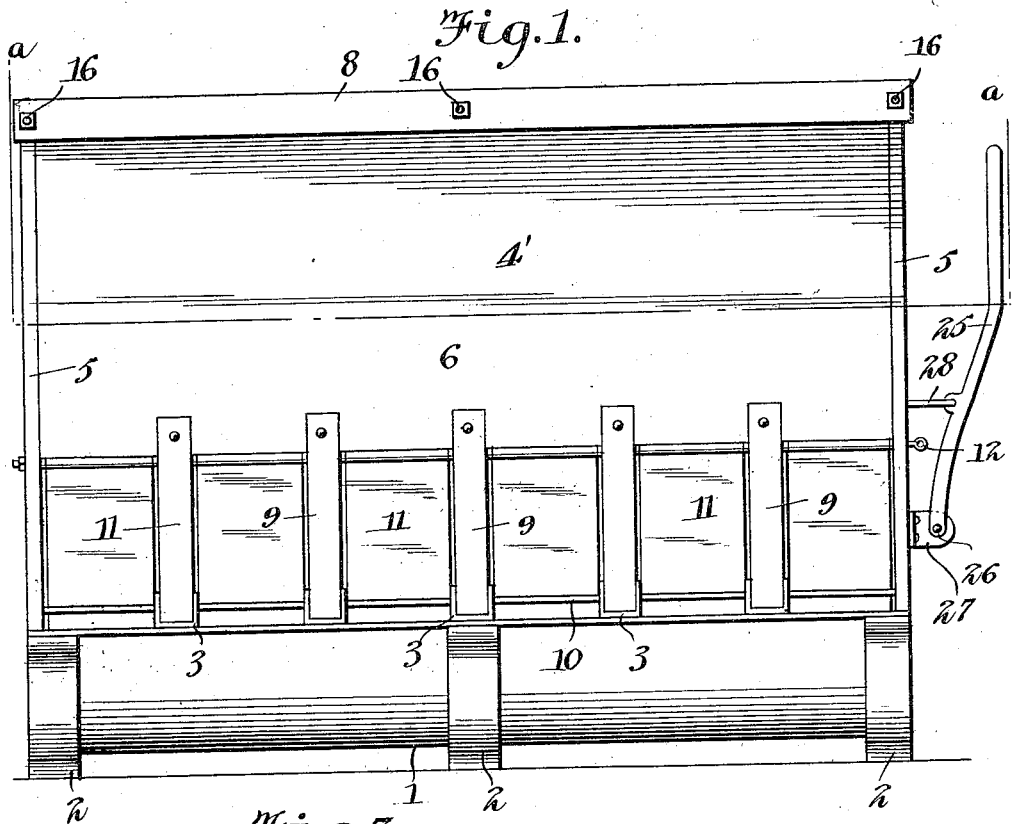
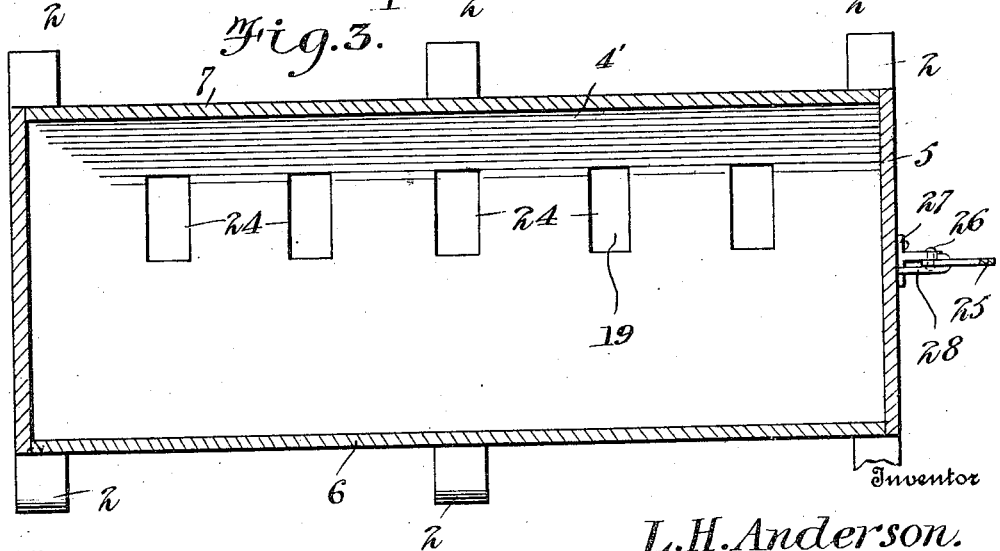
Witness
Frederick W. Ely
Inventor
L. H. Anderson.
By Victor J. Evans
Attorney L. H. ANDERSON.
FEED TROUGH.
APPLICATION FILED OCT. 8, 1915.
1,176,016.
Patented Mar. 21, 1916.
2 SHEETS—SHEET 2.
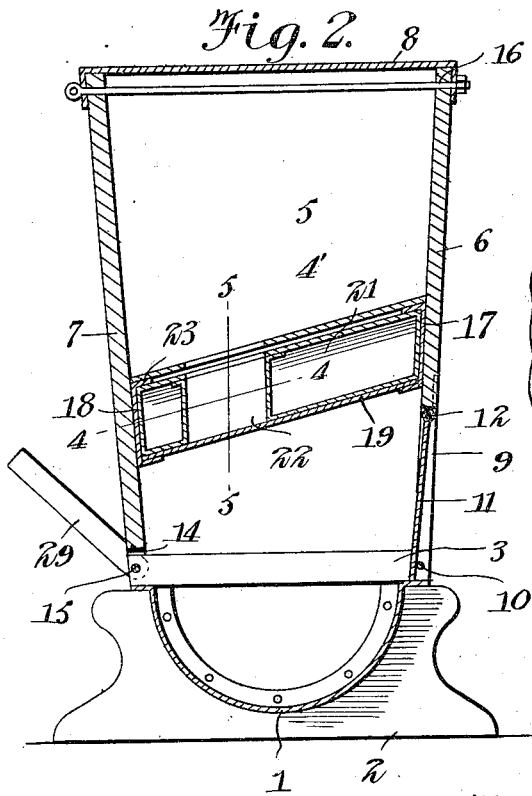
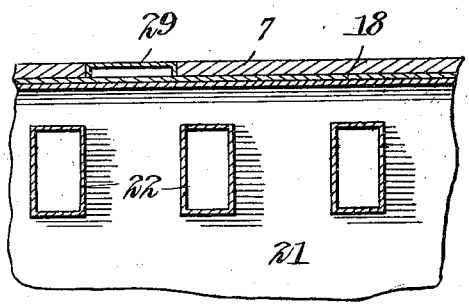
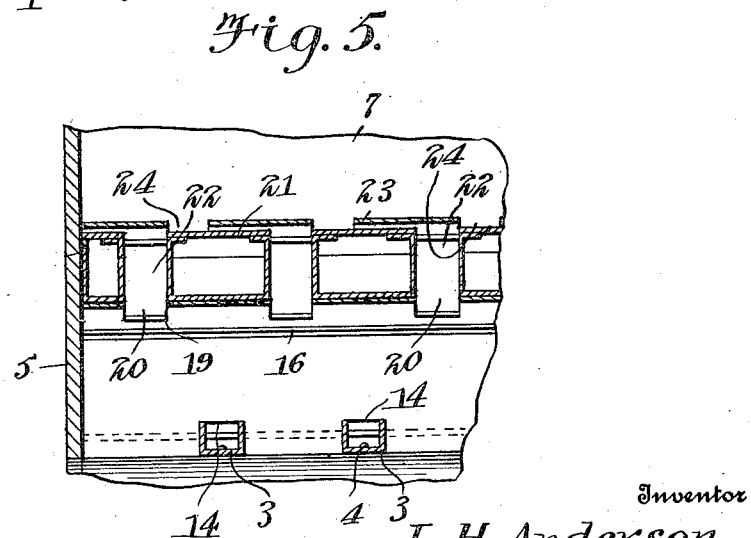
Witness
Frederick W. Ely
Inventor
L. H. Anderson,
By Victor J. Evans
Attorney

UNITED STATES PATENT OFFICE.

LOUIS H. ANDERSON, OF SPRINGDALE, WASHINGTON.

FEED-TROUGH.

1,176,016.  Specification of Letters Patent.  Patented Mar. 21, 1916.

Application filed October 8, 1915. Serial No. 54,817.

*To all whom it may concern:*

Be it known that I, LOUIS H. ANDERSON, a citizen of the United States, residing at Springdale, in the county of Stevens and State of Washington, have invented new and useful Improvements in Feed-Troughs, of which the following is a specification.

This invention relates to improvements in feed troughs, for feeding hogs and other animals, the object of the invention being to provide an improved trough by means of which a number of animals may be each fed with a regulated quantity of feed.

The invention consists in the construction, combination and arrangement of devices hereinafter described and claimed.

In the accompanying drawings:—Figure 1 is a front elevation of a feed trough constructed in accordance with my invention. Fig. 2 is a vertical transverse sectional view of the same. Fig. 3 is a horizontal sectional view of the same, on the plane indicated by the line *a—a* of Fig. 1. Figs. 4—5 are detail sectional views.

The trough 1 is here shown as semi-circular and in practice is made of sheet or plate iron, preferably galvanized and is provided at the ends and also at the center with supporting feet 2. Channeled cross bars 3 extend across the trough, are suitably spaced apart and are bolted as at 4 to opposite sides of the trough.

A feed bin 4' is arranged above the trough and comprises end walls 5, a front 6, a rear wall 7 and a cover 8. The end walls 5 are solid. The front wall 6 is provided at its lower side with bars 9 which extend downwardly therefrom, are spaced apart to correspond with the cross bars 3 and have their lower ends pivotally mounted in the front ends of the channel of the bars 3 by a pivot rod 10. The said spaced bars 9 form openings in the lower sides of the front 6. Doors 11 are arranged in the said openings, the upper ends of the said doors being pivotally mounted on a rod 12 and the said doors being adapted to swing and open inwardly, and may be readily thrust open by the animals.

The rear wall 7 is notched at its lower edge as at 14 to receive the cross bars 3 and is pivotally connected to the cross bars by a pivot rod 15. Hence the front and rear walls may be swung downwardly to expose their inner surfaces and enable them to be readily thoroughly cleaned when desired.

The cover 8 is detachably secured on the end walls and front and rear walls by suitable bolt rods 16. Horizontally arranged supporting channel bars 17—18 are respectively secured on the opposing sides of the front and rear walls 6—7, the channel bars 17 being higher than the bar 18. A bottom plate 19 is arranged in the lower portion of the channels of said bars 17—18 and is supported thereby in an inclined position, with its front side higher than its rear side as shown in Fig. 2. This plate 19 is provided with appropriately spaced discharge openings 20 which are arranged above the spaces in the feed trough formed between the cross bars 3. A feed slide 21 is slidably mounted on the plate 19 and also in the channels of the bars 17—18 and may be moved longitudinally. This feed slide is provided with feed boxes or openings 22, each adapted to hold a regulated quantity of feed, the said feed boxes or openings being open at their upper and lower sides. A top plate 23 is arranged on the upper side of the channel bars 17—18 and hence covers the feed slide, the said plates being provided with openings 24 which are out of line with the discharge opening 20 of the bottom plate 19.

Normally the feed slide is arranged with its feed boxes or openings 22 registering with and under the opening 24 of the upper plate 23 so that its feed boxes or openings are arranged between the openings 20 of the bottom plate 19 and are closed at their lower sides by said bottom plates, so that the said feed boxes or openings become filled with feed from the bin 4'. By moving the feed slide so as to cause its feed boxes or openings to move from under the openings 24 and into registry with the openings 20 the feed in the feed boxes is dropped simultaneously therefrom into the feed spaces in the trough, so that all the animals are supplied with feed at the same time. A lever 25 is provided for operating the feed slide, said lever being fulcrumed as at 26 to a bracket 27 on one end of the feed bin and being connected by a suitable link or rod 28 to the feed slide.

A chute or spout 29 is provided for supplying the water to the trough and is arranged on the front side of the trough with its lower end pivotally mounted between two of the cross bars 3 and on the pivot rod 15.

While I have herein shown and described a preferred form of my invention I would have it understood that changes may be made in the form, proportion and construction of the several parts without departing from the spirit of the invention and within the scope of the appended claims.

Having thus described my invention, I claim:—

1. A feed trough, channeled cross bars spaced apart and extending across the upper part of the trough, a feed bin on the upper side of the trough and having a wall provided on its lower side with spaced bars forming openings, the lower ends of said spaced bars being arranged in the channels of said cross bars, a pivot rod extending through said channeled cross bars and said spaced bars and pivotally mounting said wall of the feed bin, and doors arranged in the openings between the spaced bars pivotally mounted at their upper sides and thereby adapted to be swung inwardly, the said pivot rod forming a stop to prevent outward movement of the doors.

2. A feed trough, cross bars extending across the upper part of the trough and spaced apart, and a feed bin on the upper side of the trough and having front and rear walls pivotally mounted at their lower sides on the ends of said cross bars, so that said walls may be turned downwardly and outwardly, a cover for the feed bin and means to detachably secure the cover on the upper sides of walls of the bin when said walls are set up.

3. A feed trough having a feed bin arranged above the same said feed bin having channel bars on its opposing sides, a bottom plate secured in the lower portions of the said channel bars and provided with discharge openings, a feed slide on said bottom plate and mounted in the channels of said channel bars for longitudinal movement and provided with feed boxes open at their upper and lower sides, a top plate on the said channel bars, covering the feed slide and having openings arranged out of line with the openings of the bottom plate and adapted to register with the feed boxes of the slide when the slide is in initial position and means to operate the slide.

In testimony whereof I affix my signature in presence of two witnesses.

LOUIS H. ANDERSON.

Witnesses:
 HOKER NELSON, Jr.,
 JNO. P. COOL.

Copies of this patent may be obtained for five cents each, by addressing the "Commissioner of Patents, Washington, D. C."